US012353476B2

(12) United States Patent
Bakir et al.

(10) Patent No.: US 12,353,476 B2
(45) Date of Patent: *Jul. 8, 2025

(54) ASSOCIATION OF DATA ITEMS AND OBJECTS

(71) Applicant: Google LLC, Mountain View, CA (US)

(72) Inventors: Gokhan H. Bakir, Zurich (CH); Marcin M. Nowak-Przygodzki, Zurich (CH)

(73) Assignee: GOOGLE LLC, Mountain View, CA (US)

(*) Notice: Subject to any disclaimer, the term of this patent is extended or adjusted under 35 U.S.C. 154(b) by 386 days.

This patent is subject to a terminal disclaimer.

(21) Appl. No.: 16/907,641

(22) Filed: Jun. 22, 2020

(65) Prior Publication Data

US 2020/0320119 A1  Oct. 8, 2020

Related U.S. Application Data

(63) Continuation of application No. 15/844,201, filed on Dec. 15, 2017, now Pat. No. 10,691,747.

(60) Provisional application No. 62/587,232, filed on Nov. 16, 2017.

(51) Int. Cl.
| | |
|---|---|
| *G06F 16/9032* | (2019.01) |
| *G06F 16/3329* | (2025.01) |
| *G06F 16/432* | (2019.01) |
| *G06F 16/532* | (2019.01) |
| *G06F 16/58* | (2019.01) |
| *G06F 16/583* | (2019.01) |
| *G06F 16/908* | (2019.01) |
| *G10L 15/08* | (2006.01) |

(52) U.S. Cl.
CPC .... *G06F 16/90332* (2019.01); *G06F 16/3329* (2019.01); *G06F 16/434* (2019.01); *G06F 16/532* (2019.01); *G06F 16/5854* (2019.01); *G06F 16/5866* (2019.01); *G06F 16/908* (2019.01); *G10L 15/08* (2013.01)

(58) Field of Classification Search
CPC ............ G06F 16/5866; G06F 16/3329; G06F 16/434; G06F 16/532; G06F 16/5854; G06F 16/90332; G06F 16/908; G06V 10/40; G10L 15/08
See application file for complete search history.

(56) References Cited

U.S. PATENT DOCUMENTS

| | | | |
|---|---|---|---|
| 8,694,522 B1 | 4/2014 | Pance | |
| 9,672,436 B1 | 6/2017 | Dhua | |
| 10,051,108 B2 | 8/2018 | Bakir et al. | |
| 2003/0088421 A1 | 5/2003 | Maes et al. | |

(Continued)

OTHER PUBLICATIONS

European Patent Office; Preliminary Opinion issued in Application No. 18804797.1, 10 pages, dated Mar. 25, 2022.

(Continued)

*Primary Examiner* — Nancy Bitar

(74) *Attorney, Agent, or Firm* — Gray Ice Higdon

(57) ABSTRACT

Methods, systems, and apparatus, for associating data items with objects depicted in an image and search the associated data items based on object detected in images that are (Continued)

subsequently processed and presenting the data items associated with an object when the object is identified in the subsequently processed image.

20 Claims, 7 Drawing Sheets

(56) References Cited

U.S. PATENT DOCUMENTS

| | | | |
|---|---|---|---|
| 2011/0035406 A1* | 2/2011 | Petrou | G06F 16/438 |
| | | | 707/769 |
| 2014/0152696 A1 | 6/2014 | Jung et al. | |
| 2014/0241617 A1* | 8/2014 | Shotton | G06F 18/214 |
| | | | 382/159 |
| 2014/0310255 A1 | 10/2014 | Cardell | |
| 2015/0242932 A1* | 8/2015 | Beguin | G06Q 30/06 |
| | | | 705/26.8 |
| 2016/0103932 A1 | 4/2016 | Sathish et al. | |
| 2016/0247188 A1* | 8/2016 | Zhou | G06F 16/9535 |

OTHER PUBLICATIONS

European Patent Office; Summons to Attend Oral Proceedings Pursuant to Rule 115(1) EPC, 9 pages Jan. 4, 2022.

European Patent Office; Communication Pursuant Article 94(3) EPC issued in Application No. 18804797.1; 7pages; dated Mar. 17, 2021.

PCT International Search Report and Written Opinion issued in International Application No. PCT/US2018/058394 mailed on Feb. 18, 2019, 16 pages.

techcurnch.com' [online] "Google Lens will let smartphone cameras understand what they see and take action," Sarah Perez, May 17, 2017, [ retrieved on Mar. 16, 2018] Retrieved from Internet: URL<https://techcrunch.com/2017/05/17/google-lens-will-let-smarphone-cameras-understand-what-they-see-and-take-action/> 9 pages.

China National Intellectual Property Administration; First Office Action issued in Application No. 201880036010.7; 33 pages; dated Nov. 29, 2022.

China National Intellectual Property Administration; Decision of Rejection issued for Application No. 201880036010.7, 13 pages, dated Nov. 14, 2023.

China National Intellectual Property Administration; Decision of Reexamination issued for Application No. 201880036010.7, 34 pages, dated Nov. 19, 2024.

China National Intellectual Property Administration; Notification of Reexamination issued for Application No. 201880036010.7, 26 pages, dated Sep. 30, 2024.

* cited by examiner

ASSOCIATION OF DATA ITEMS AND OBJECTS

BACKGROUND

Mobile devices provide a variety of functions—Internet access, camera image capture and image storage, general data storage, contact management, and the like. Many mobile devices include software for responding to an utterance of a user of the device. Some utterances can include instructions to the device to call a phone number, text a phone number, operate an application, or search for information on the mobile device or the Internet. The devices employ speech-to-text, or automated speech recognition (ASR), processes to recognize a voice input from the user. Such applications are generally referred to as "assistants."

Assistant applications can generally relate certain utterances to commands and arguments. For example, using speech recognition techniques, an assistant can convert the utterance "show me some pictures of Julia," to text. Then, for example, by use of a text command model, the assistant can interpret the text "show me some pictures Julia" to invoke a command to search for images stored on the device, or, alternatively, stored in a cloud account associated with the user. The word "Julia" is resolved to a label tag, and thus the search is directed to images tagged with the label "Julia." A variety of other, more complex operations can also be facilitated.

SUMMARY

This specification relates to associating data items with objects, and then surfacing In general, one innovative aspect of the subject matter described in this specification can be embodied in methods that include the actions of receiving image data of an image that is displayed on a display of the user device; performing image processing on the image data to identify one or more objects depicted in the image; generating a search query based on the identified one or more objects depicted in the image, the search query being generated independent of a query input by the user; searching, by the search query, a data storage storing an association of data items with objects; determining whether data items stored in the data storage are responsive to the search query; in response to determining that data items stored in the data storage are responsive to the search query: generating, in the display on the user device, a prompt that is displayed with the image and that describes that data items responsive to an object depicted in the image are available for display on the user device; and in response to a selection responsive to the prompt by a user, displaying one or more of the data items on the display of the user device. Other embodiments of this aspect include corresponding systems, apparatus, and computer programs, configured to perform the actions of the methods, encoded on computer storage devices.

In some implementations, performing image processing on the image data to identify one or more objects depicted in the image comprises performing image processing to identify a plurality of objects depicted in the image; and generating a search query based on the identified one or more objects depicted in the image comprises generating a respective search query for each of the plurality of objects identified in the image.

In some implementations, generating, in the display on the user device, a prompt that is displayed with the image and that describes that data items responsive to an object depicted in the image are available for display on the user device comprises generating, for each of the identified plurality of objects, a visual indicator that indicates the object is selectable.

In some implementations, response to a selection of one of the visual indicators, the system provides the respective search query for the object indicated by the visual indicator as input to a search process.

In some implantations, the data items include one or more of images, audio, video, or fact data input by a user of the user device.

In some implementation, the data storage comprises: metadata associating object labels with user-specified data, each object label being a label that is generated in response to an object being recognized in an image by image processing; and generating the search query based on the identified one or more objects depicted in the image comprises generating a search query that specifies the object labels of the one or more objects depicted in the image.

Another innovative aspect of the subject matter described in this specification can be embodied in methods that include the actions receiving image data of an image captured by at least one image capture apparatus of a user computing device; identifying, from the received image data, at least one object depicted in the image; in response to identifying the at least one object depicted in the image, identifying, in at least one computer memory in which objects are associated with items of previously stored information, at least one item of previously stored information associated with the identified at least one object depicted in the image; in response to identifying the at least one item of previously stored information associated with the identified at least one object depicted in the image, outputting, from the user computing device, a prompt indicating the availability of the identified at least one item of previously stored information associated with the identified at least one object depicted in the image.

In the aspect above, identifying, from the received image data, the at least one object depicted in the image, comprises determining an object classification of the at least one object, based on at least one object label associated with the at least one object in the computer memory.

In the aspect above, identifying the at least one item of previously stored information associated with the identified at least one object depicted in the image, comprises: searching, in the computer memory, for items of previously stored information linked by metadata to the determined object classification; and identifying, as part of said searching, the at least one item of previously stored information associated with the identified at least one object depicted in the image as at least one item of information linked by metadata to the determined object classification.

In any the aspects above, the object classification indicates a type of the at least one object depicted in the image.

In any of the aspects above, outputting the prompt indicating the availability of the identified at least one item of previously stored information associated with the identified at least one object depicted in the image comprises displaying, on a screen of the user computing device, a user selectable indicator which, when selected by a user, causes the user computing device to display the identified at least one item of previously stored information on the screen.

In any of the aspects above, outputting the prompt indicating the availability of the identified at least one item of previously stored information associated with the identified at least one object depicted in the image comprises displaying, on a screen of the user computing device, a user selectable indicator which, when selected by a user, causes the user computing device to audibly output the identified at least one item of previously stored information.

In any of the aspects above, the items of previously stored information in the computer memory comprise a user corpus of data. The user corpus of data is specific to a user of the user computing device.

An apparatus may include at least one computer processor and at least one computer memory storing computer-executable instructions which, when executed by the at least one computer processor, cause any of the aspects above to be performed.

A computer program comprising computer-executable instructions which, when executed by at least one computing apparatus, cause any of the aspects above to be performed.

Particular embodiments of the subject matter described in this specification can be implemented so as to realize one or more of the following advantages. A technical problem solved by the subject matter described below is the association of visual data (e.g., objects) with data items without the need for particular visual data. Instead, language processing is used to identify objects specified in an input, and, based on the identified object, associate the object with the data item (e.g., an item of interest that the user wants to remember). By determining a class or label of or for an object identified in the input, the system allows for later visual processing of an image and the surfacing of the data item of interest associated with an object depicted in the image, even though the particular image may have not been processed or even in existence at the time of the association of the object with the data item. This allows for the data item to be surfaced for many different images that each depict an object that is specified by the association, resulting in high recall at the time of image processing.

In some implementations, the search queries are used to conduct a constrained search over the user corpus, and thus surface only data items that are specific to the user and associated with the identified one or more objects depicted in the image. By constraining the search to user specific data associated with the identified one or more objects depicted in the image, only a limited amount of computer resources are required to conduct the search.

Moreover, if the user data are stored locally, then the search may be conducted on the user device itself, thus conserving bandwidth and reducing latency that would otherwise be impacted by searching data stored at remote servers. By initially displaying, or otherwise outputting, the prompt, the computing system performing the method initially conserves resources and may expend further resources on outputting the one or more data items, for example on the display of the user device, only when the prompt is selected by the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to systems and methods for searching a user-specific corpus of data using object labels that identify objects recognized from an image displayed on a user device. The user-specific corpus includes metadata associating object labels with user-specified data. Each object label is a label that is generated in response to an object being recognized in an image by image processing. The user device may process an image displayed in a user device display, such as a live camera image, and generate one or more search queries based on the identified one or more objects depicted in the image. The search queries are used to conduct a constrained search over the user corpus, and thus surface only data items that are specific to the user and associated with the identified one or more objects depicted in the image. By constraining the search to user specific data associated with the identified one or more objects depicted in the image, only a limited amount of computer resources are required to conduct the search. Moreover, if the user data are stored locally, then the search may be conducted on the user device itself, thus conserving bandwidth and reducing latency that would otherwise be impacted by searching data stored at remote servers.

If the system determines, from the search, that data items stored in the user corpus are responsive to the search query, the system then generates, in the display on the user device, a prompt that is displayed with the image and that describes that data items responsive to an object depicted in the image are available for display on the user device. In response to a selection of the prompt by a user, the system displays one or more of the data items on the display of the user device. By initially displaying, or otherwise outputting, the prompt, the computing system performing the method initially conserves resources and may expend further resources on outputting the one or more data items, for example on the display of the user device, only when the prompt is selected by the user.

In some implementations, when a plurality of objects is depicted in the image, the system generates a respective search query for each of the plurality of objects identified in the image. The system may then generate, for each of the identified plurality of objects, a visual indicator that indicates the object is selectable. In response to a selection of one of the visual indicators, the system provides the respective search query for the object indicated by the visual indicator as input to a search process. This implementation conserves processing resources by allowing the user to select only the object that is of interest to the user, and thus search processing resources are not consumed by searching based on other objects that are recognized by the system but may not be of interest to the user and thus have not been selected.

These features and additional features are described in more detail below.

Figure 1:
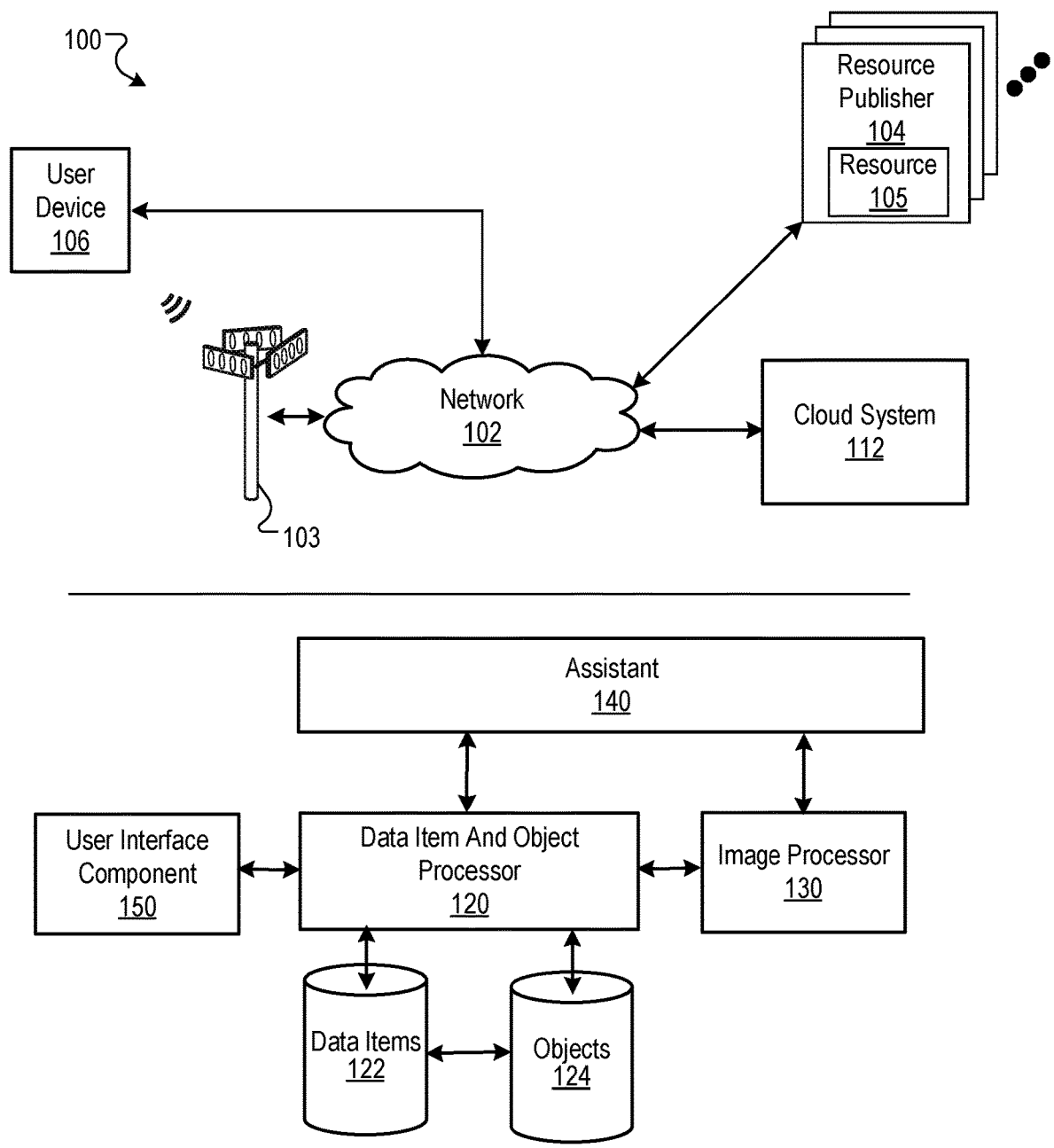
FIG. 1 is a block diagram of an example environment in which data items are associated with image objects and processed.

FIG. 1 is a block diagram of an example environment 100 in which data items are associated with image objects and processed. A computer network 102, such as the Internet, or a combination thereof, provides for data communication between electronic devices and systems. The computer network 102 may also include, or be in data communication with, one or more wireless networks 103 by means of one or more gateways.

A resource publisher 104 includes one or more resources 105. There may be one or more resource publishers 104. The resource publisher 104 may be a website publisher, an application publisher, among others. In implementations where the resource publisher 104 is a website publisher, the one or more resources 105 are associated with a domain and hosted by one or more servers in one or more locations. Generally, a resource publisher website is a collection of web pages formatted in hypertext markup language (HTML) that can contain text, images, multimedia content, and programming elements. Each website is maintained by a content publisher, which is an entity that controls, manages and/or owns the website. A web page resource is any data that can be provided by a publisher resource 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts. More generally, a "resource" is anything identifiable over a network.

User device 106 is an electronic device that is under the control of a user and is capable of requesting and receiving resources over the network 102, also capable of performing other actions. Example user devices 106 include personal computers, mobile communication devices, wearable devices, and other devices that can send and receive data over the network 102. In the example of FIG. 1 the user device 106 is a smartphone. An example smartphone is described with reference to FIG. 5 below. The user device 106 may communicate over the networks 102 and 103 by means of wired and wireless connections with the networks 102 and 103, respectively. The user device 106 may also be a device that accesses the network 102 by means of an intermediate device and a short range wireless transceiver, such as a WiFi, Bluetooth, etc. As described with reference to FIG. 5, a user device may be able to perform a set of device actions for various programs and capabilities.

The user device 106 is associated with a user account, such as an account hosted by a cloud system 112 that provides multiple services. These services may include search (web, intranet, documents, and applications, among others), web mail, calendar, social networking, messaging, documents storage and editing, an electronic assistant service, etc. The account data 114 may store data specific to the account of the user device 106. Further, although only one user device 106 is shown in FIG. 1, a plurality of user devices 106 may be included.

A data item and object processor 120 manages an association of data items 122 and objects 124. The data item and object processor 120 may be implemented entirely within the user device 106, or may be implemented within the cloud system 112, or may be distributed between the user device 106 and the cloud system 112.

As used in this specification, an "object" is an object that is depicted in image data. An object may be a unique object, such as a particular person as identified by facial features or unique tags, or may be a class that describes certain types of objects, such as a dogs, cats, wine bottles, and the like. Additionally, a data item is any item of data that can be displayed on the user device and that can be associated with an object in an image. Thus, a data item may be text, audio, video, an image, reminders, and the like.

An object can be detected by an image processor 130. The image processor 130 may be a collection of processes, e.g., neural networks trained to recognize objects of particular types, facial recognition processes, or any other appropriate system or process that can recognize objects in images.

In some implementations, the data item and object processor 120 and the image processor 130 may be invoked by an assistant 140 that provides voice-enabled operations for the user device 106. Like the data item and object processor 120, the assistant 140 and associated processes may be implemented entirely within the user device 106, or may be implemented within the cloud system 112, or may be distributed between the user device 106 and the cloud system 112.

The assistant 140 utilizes a speech processing system that receives voice inputs, performs language recognition processing, and parses the resulting recognized words and phrases. The parsed words and phrases are then processed to determine whether the voice input invokes a particular action. Any appropriate speech processing system may be used to process the voice inputs. Likewise, text commands that are input by a user by typing may also be processed as described below.

Figure 2A:
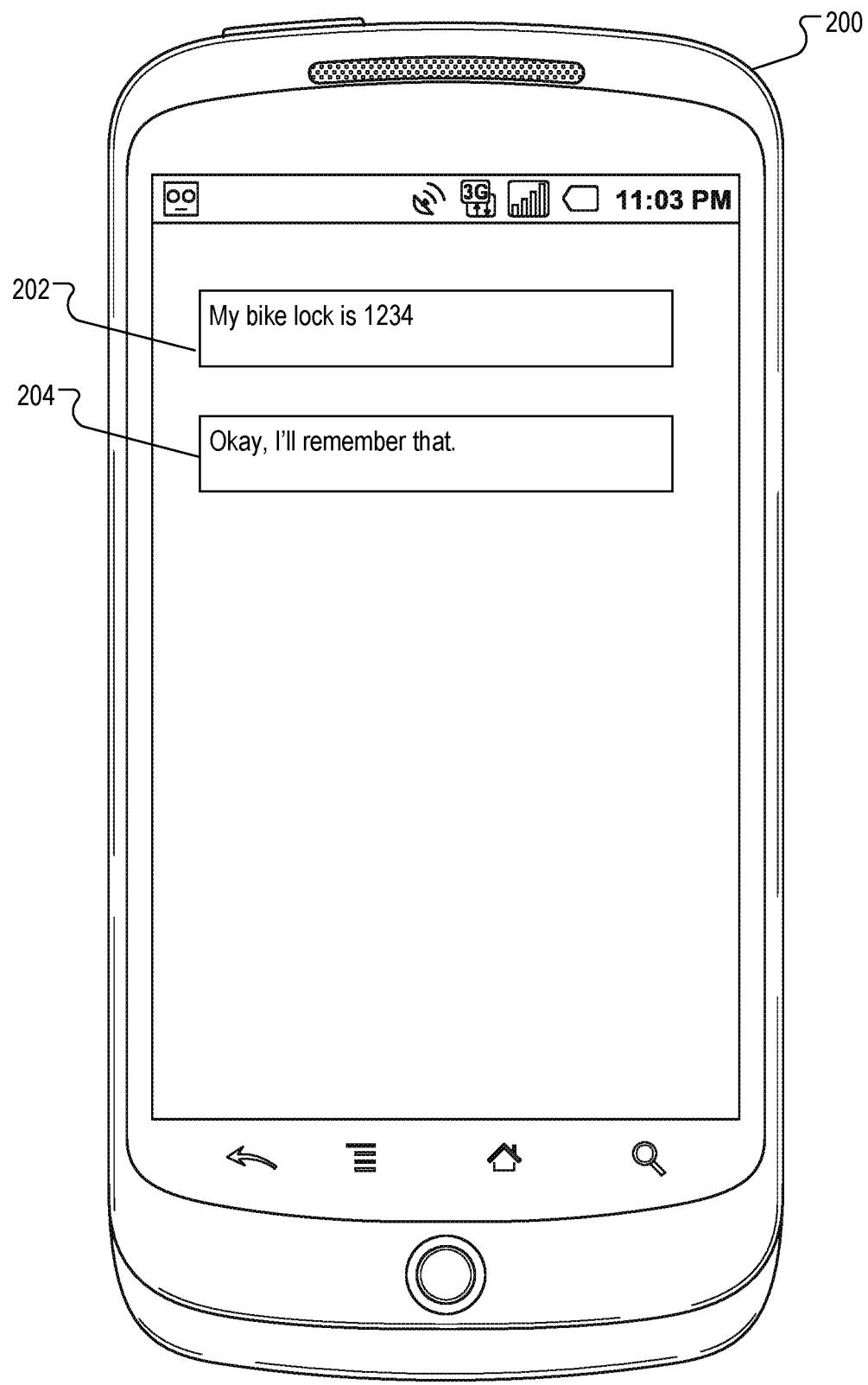
FIGS. 2A, 2B and 2C are illustrations of a user interface in which data items associated with objects are surfaced for presentation to a user.

In operation, assistant 140 processes an input and determines whether the input requires the association of an object with data item. An example input that results in this determination is shown in FIG. 2A. Here, a user has input to a user device 200 the utterance "My bike lock is 1234," as illustrated by the text box 202. The assistant 140, utilizing a speech processing algorithm, determines that there is an association between the data item "1234" and the object "bike lock." In some implementations, more than one association can be determined, e.g., the assistant 140 may determine that both objects "bike" and "bike lock" are to be associated with the data item 1234.

To make the determination, the assistant 140 may, for example, use a grammar that, upon a successful consumption parse of an input, resolves to a command that associates the values (bike, bike lock, lock) that parsed to a non-terminal object with a value that parsed to a non-terminal data item (1234). The command, for example, is a data entry command that stores in memory an association of the data item "1234" with the objects "bike," "lock," and "bike lock." The association is depicted by the linked data stores storing data items 122 and objects 124.

As shown in FIG. 2, the assistant 140 has stored the association, as indicated by the reply text box 204, through which the assistant 140 responds with "Okay, I'll remember that."

In some implementations, an association operation may be invoked by the user so that the user can explicitly invoke the association. For example, a user may utter a hot word or phrase, e.g., "Now remember this," followed by an object and data item description. In response to detecting this phrase, the assistant 140 will associate the specified object with the specified data item. For example, a user may utter "Now remember this: Bike lock is 1234," to associate "bike lock" with the data item "1234." Likewise, a user may utter "Now remember this: Oak Cellar Wines is my favorite Chardonnay" to associate the object "Oak Cellar Wine" with the data item "favorite Chardonnay."

In some implementations, a data item generated by the user device or received by the user device may be associated with an object upon generation or receipt. For example, assume a user receives a notification from a car dealership that the user's car is due for service. The data item and object processor 120 may associate the notification with a "car"

object. Then, at a later time, should the user process an image with a car in it, the user device may remind the user that the user's car is due for service.

At a later time, a user may use the user device 106 to display an image. The image processor 130 processes the image and identifies objects depicted in the image. The identified objects are provided to the data item and object processor 120, which, in turn, searches the objects 124 data using the identified object as a query, and identifies associated data items 122. In response to determining that data items stored in the data storage are responsive to the search query, the data item and object processor 120 invokes a user interface component 150 that generates data that causes the user device 106 to display a prompt with the image. The prompt describes that data items responsive to an object depicted in the image are available for display on the user device 106. Should the user select the prompt, the system displays the data items on the display of the user device 106.

Figure 2B:
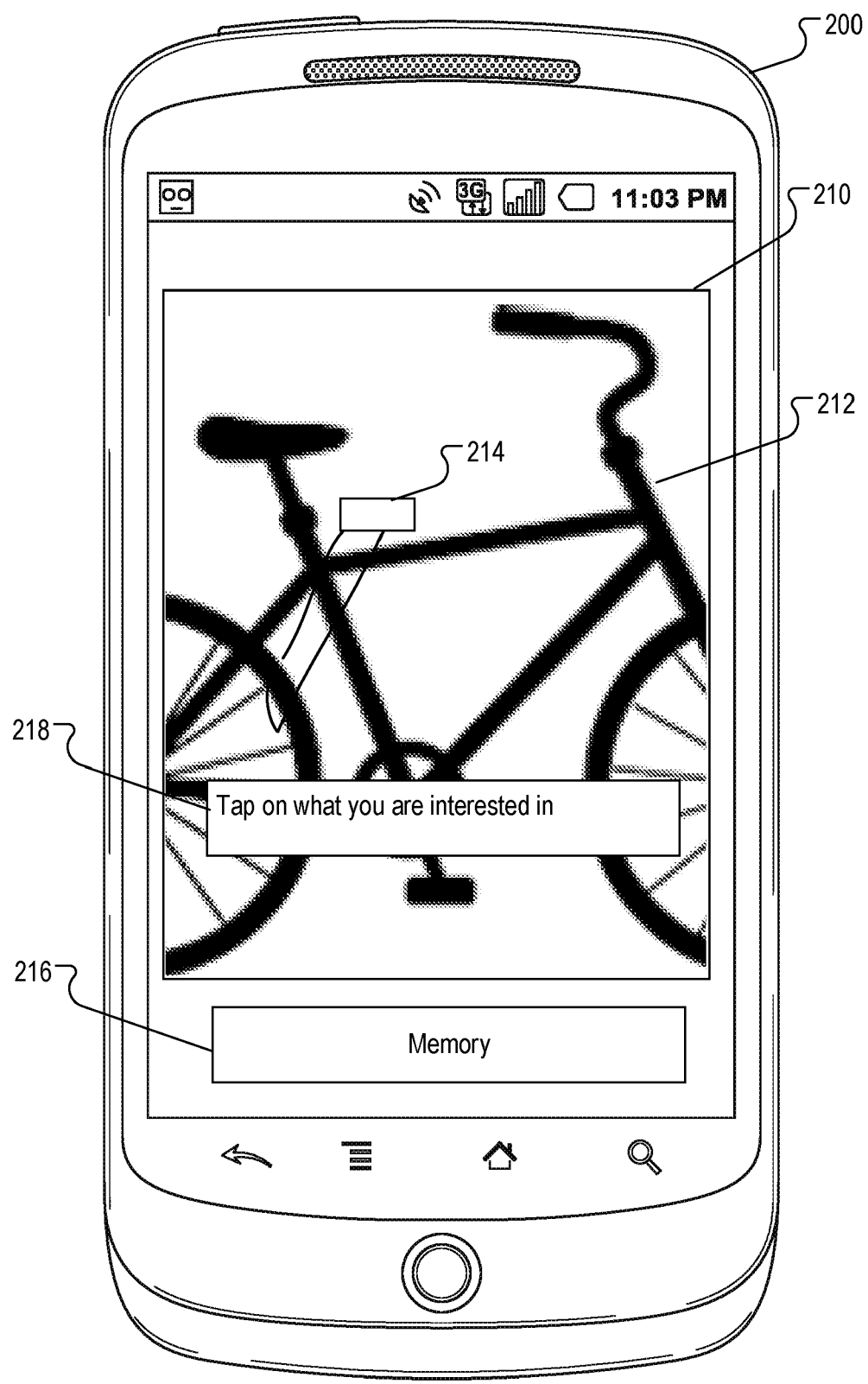
Figure 2C:
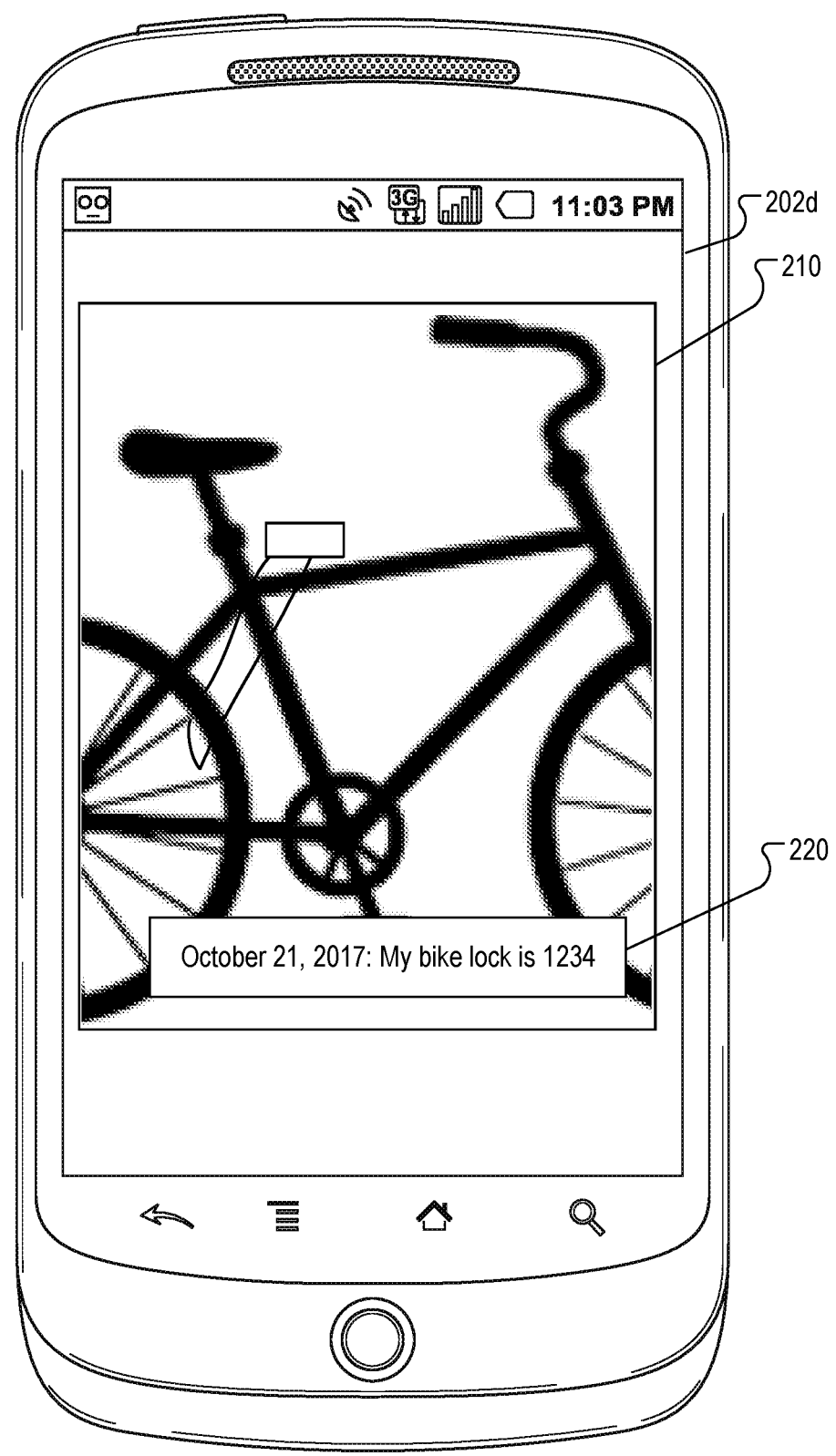

FIGS. 2B and 2C depict the results in a user interface of a user device 200. In FIG. 2B, an image 200 depicting two distinct objects—a bike 212 and a bike lock 214—are displayed. The image processor 130 processes the image 210, and recognizes these objects. Accordingly, the data item and object processor 120 is invoked, and the association with the data item "1234" is identified. In response, a "memory" notification 216 is displayed, and an instruction 218 that instructs the user to tap on what the user is interested in is displayed. The instruction 218 may be displayed when, for example, there are multiple objects detected, e.g., the "bike" and "bike lock." Alternatively, the instruction 218 may be displayed to confirm that the user desires to have the associated data item displayed.

The user then taps on the bike lock object 214. In response to a selection responsive to the prompt by the user, the user device 200 displays the data item "1234." As shown in FIG. 2C, the data item is displayed in a context in which it was received, i.e., in the context of the input utterance "My bike lock is 1234," as shown by the text box 220. In an alternate implementation, only the data item "1234" may be displayed.

In another implementation, the user interface component 150 generates data that causes each detected object for which there is an associated data item to be highlighted. For example, in FIG. 2B, assume that only the object "bike lock" is associated with the data item "1234." In response to a detection of the bike object and the bike lock object, the data item and object processor 120 will only identify the data item "1234" based on the object "bike lock." Thus, the bike lock object 214 in the image 210 may be highlighted (e.g., surrounded by a bounding box, or its color changed, etc.) while the bike object 212 will not be highlighted. Upon selection of a highlighted object, the associated data item is displayed.

Figure 3:
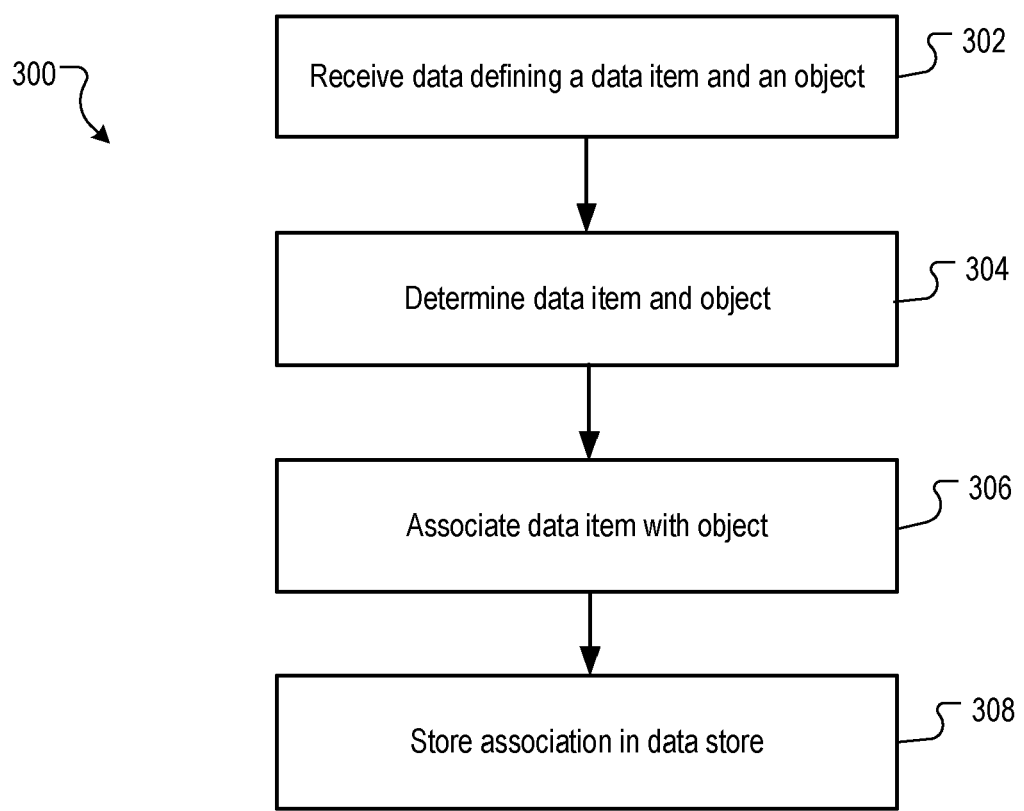
FIG. 3 is a flow chart of an example process for associating data items with objects.

FIG. 3 is a flow chart of an example process 300 for associating data items with objects. The process 300 is implemented in a data processing apparatus, such as the user device 106, or the cloud system 112, or a combination of the device 106 and the cloud system 112.

The process 300 receives data defining a data item and an object (302). For example, the assistant 140 may receive an utterance as described above, where the utterance includes terms that describe an object and a data time.

The process 300 determines the data item and the object (304). For example, the assistant performs speech processing and semantic processing to identify the object and the data item.

The process 300 associates the data item with the object (306). For example, the data item and object processor 120 defines an association between the object and the data item. In some implementations, the association may also include the utterance, e.g., as shown in FIG. 2C, the utterance "My bike lock is 1234" may be associated with the object "bike lock."

The process 300 stores the association in a data store (308). For example, the data item and object processor 120 stores the association in a data storage that includes the data items 122, and objects 124, and data defining the associations between the data items 122 and objects 124. In some implementations, the data storage includes metadata associating object labels with user-specified data. Each object label may be a label that is generated in response to an object being recognized in an image by the image processor 130.

Figure 4:
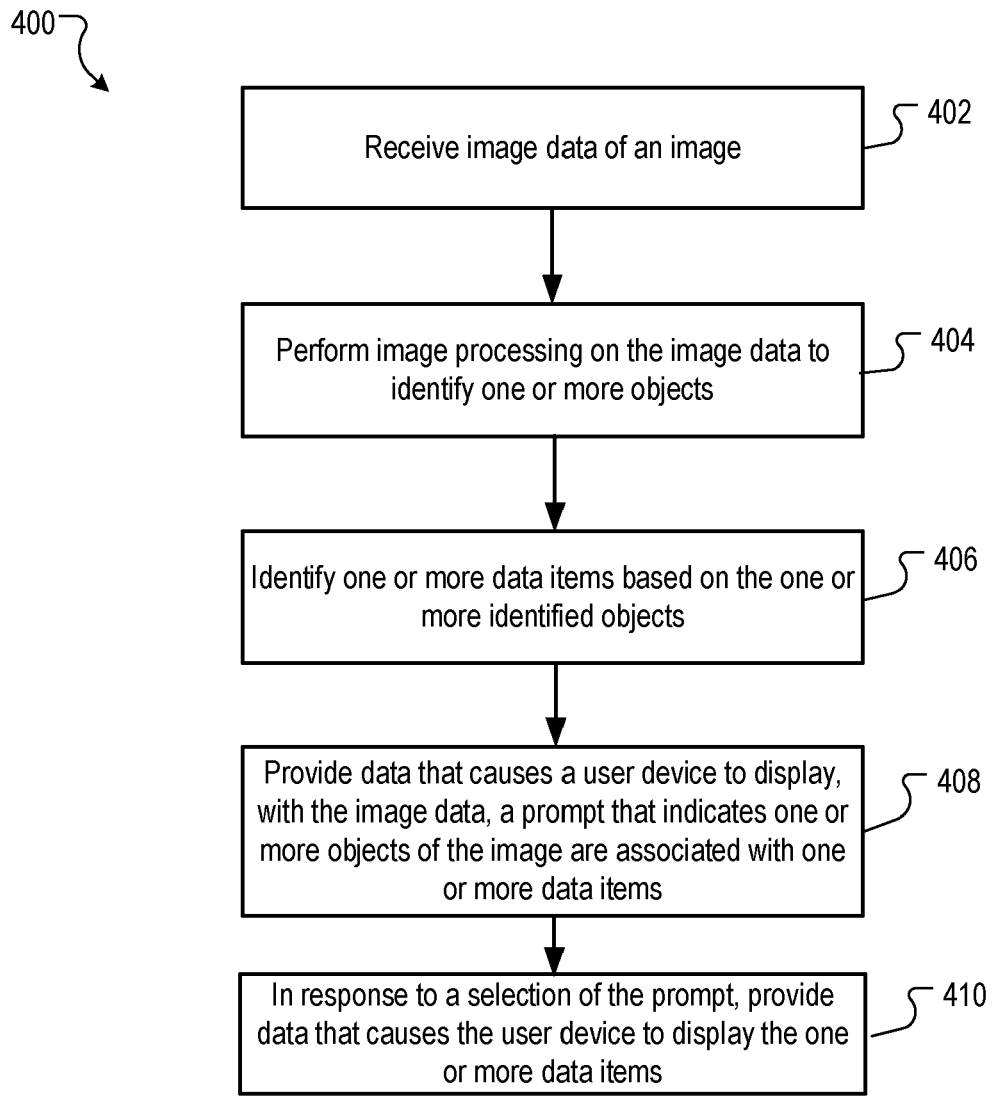
FIG. 4 is a flow chart of an example process for identifying data items based on detected objects.

FIG. 4 is a flow chart of an example process 400 for identifying data items based on detected objects. The process 400 is implemented in a data processing apparatus, such as the user device 106, or the cloud system 112, or a combination of the device 106 and the cloud system 112.

The process 400 receives image data of an image (402). For example, the image processor 130 may receive image data of an image that is displayed on a display of the user device. The image may be an image that was captured by at least one image capture apparatus of a user device, e.g., by a camera on the user device. Alternatively, the image may be a stored image that was provided to the device 106, or an image that was obtained from a resource 105 received over the network 102.

The process 400 performs image processing to identify one or more objects (404). For example, the image processor 130 processes the image to identify one or more objects depicted in the image, as described above. Any appropriate image processing technique that can identify objects depicted in images can be used.

The process 400 identifies one or more data items based on the one or more identified objects (406). The data items may be generated in a variety of ways. For example, the data item and object processor 120 may receive from the image process 130 a list of identified objects and, in response, generate a search query based on the identified one or more objects depicted in the image. The search query is generated independent of a query input by the user, i.e., the user need not specify terms of the query. The query may be terms that describe the object and derived from the list of identified objects. Query expansion, synonym usage, and other techniques may also be used to generate the queries.

In some implementations, the search query is generated by generating a query that specifies the object labels of the one or more objects depicted in the image.

The data item and object processor 120 then searches, by use of the one or more search queries, the data storage that stores the association of data items 122 and objects 124. A variety of appropriate search techniques can be used.

Thus, in response to identifying an object in the image, the system can identify from data stored in the computer memory in which objects are associated with items of previously stored information, at least one or more item of previously stored information associated with the identified object.

Assuming a responsive data item is identified, the process 400 provides data that causes a user device to display, with the image data, a prompt that indicates one or more objects of the image are associated with one or more data items (408). For example, the user interface component 150 generates data that causes the display on the user device to display a prompt with the image. The prompt describes or indicates that data items responsive to an object depicted in the image are available for display on the user device. The type of data that causes the display of the prompt depends on the display processing used. For example, if the image is displayed as part of a mark-up resource, the data may be instructions inserted into the document object model of the resource. Other display processing techniques can also be used.

The prompt may be a highlight of an object that indicates the object is selectable, or may be a button with a textual description that a data item (e.g., a "memory") is associated with an object.

In the event that multiple objects are identified and multiple separate data items are determined to be responsive, each object may be separately selectable. The selection of the object may then result in only its associated data items being displayed. For example, assume an image has a picture of a dog and a car, and the corpus of user data has associated with the object "dog" that the user's dog has a grooming appointment set for tomorrow. Likewise, the object "car" has a data item associated with it that indicates the car is due for service.

The process 400, in response to a selection of the prompt, provides data that causes the user device to display the one or more data items (410). For example, as show in FIG. 2C, in response to selecting the prompt 218 of FIG. 2B, the text box 220 is displayed with the data item.

In the event of multiple, selectable objects, should the user select the car, the data item that is the notification for service will be displayed. Conversely, should the user select the dog, then the data item describing the grooming appointment will be displayed.

Other implementations in addition to those described above can also be used. For example, although the data items have been displayed as text, other data items, such as images videos, can be displayed. Moreover, the data item may be audibly output by the user device. Thus, a data item need not only be text.

In some implementations, the data items and object associations are a user specific corpus that is specific to the user device, and do not include data from other users. The user specific corpus may be associated with a user account if the processing is done in the cloud system 112. By constraining the search to user specific data associated with the identified one or more objects depicted in the image, only a limited amount of computer resources are required to conduct the search. Moreover, if the user data are stored locally, then the search may be conducted on the user device itself, thus conserving bandwidth and reducing latency that would otherwise be impacted by searching data stored at remote servers.

Other user interaction models can also be facilitated by the system. For example, a currently captured image can be used in conjunction with a "memory" function to surface data items responsive to objects depicted in the device display. A variety of different types of data items may be displayed, depending on the objects identified, the associated data items, and the options available for displaying the data items.

Data items may also have a temporal aspect that can be the subject of a search, and, in some implementations, need not be pre-associated with an object. For example, a user may point a camera at a television and utter "when did I buy this?" In response, the image processor 130 identifies the object of "television." The data item and object processor 120 then generates a query set based on the utterance, e.g., "television purchase" and searches a user specific corpus, e.g., a user's e-mail corpus. In response, an e-mail receipt showing the purchase date and price of the television will be identified and displayed.

In some implementations, for each identified object, a visual indicator that indicates the object is selectable is generated but a search is not conducted. Only in response to a selection of one of the visual indicators does the system provide the respective search query for the object indicated by the visual indicator as input to the search process. This implementation conserves processing resources by allowing the user to select only the object that is of interest to the user, and thus search processing resources are not consumed by searching based on other objects that are recognized by the system but may not be of interest to the user and thus have not been selected.

In situations in which the systems discussed herein collect personal information about users, or may make use of personal information, the users may be provided with an opportunity to control whether programs or features collect user information (e.g., information about a user's social network, social actions or activities, profession, a user's preferences, a user's current location, location trajectory, inferred locations such as home/work, inferred context, calendar data, upcoming events/bookings from email, etc.), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 5:
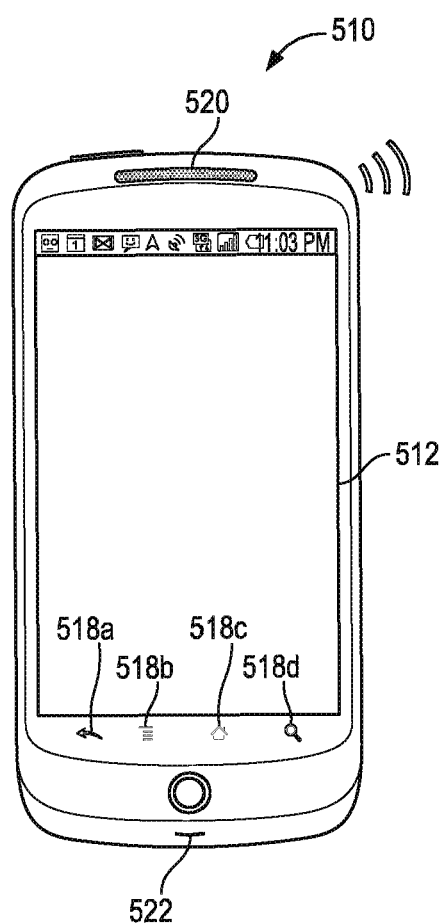
FIG. 5 depicts an example mobile computing device.

FIG. 5 depicts an example mobile computing device. In this illustration, the mobile computing device 510 is depicted as a handheld mobile telephone (e.g., a smartphone, or an application telephone) that includes a touchscreen display device 512 for presenting content to a user of the mobile computing device 510 and receiving touch-based user inputs. Other visual, tactile, and auditory output components may also be provided (e.g., LED lights, a vibrating mechanism for tactile output, or a speaker for providing tonal, voice-generated, or recorded output).

The mobile computing device 510 may include mechanical or touch sensitive buttons 518a-d. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

The mobile computing device 510 may include other applications, computing subsystems, and hardware. A voice recognition service may receive voice communication data received by the mobile computing device's microphone 522, and translate the voice communication into corresponding textual data or perform voice recognition.

The mobile computing device 510 may communicate wirelessly with one or more networks to provide a variety of services, such as voice and data services.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Embodiments of the subject matter described in this specification can be implemented in a computing system that includes a back end component, e.g., as a data server, or that includes a middleware component, e.g., an application server, or that includes a front end component, e.g., a user computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
   receiving an input from a user of a user device, the input including a voice input;
   storing, based on processing the input, including the voice input, and based on a current state of the user device, a user-specific association of a given data item with a given type of physical object, wherein storing the user-specific association is in a user-specific data storage that is associated with a user account of the user, wherein the given data item and the user-specific association are specified in the voice input; and subsequent to receiving the input and storing the user-specific association of the given data item with the given type of physical object:

receiving image data of an image that is captured by a camera of the user device, and that is captured by the camera subsequent to receiving the input and storing the user-specific association of the given data item with the given type of physical object;

performing image processing on the image data to identify a type for an object that is depicted in the image;

generating a search query based on the type identified by performing the image processing;

causing a search to be conducted, based on the search query, to determine that the user-specific association, of the given data item with the given type of physical object, stored in the user-specific data storage is responsive to the search query; and in response to determining that the user-specific association is responsive to the search query:

causing the given data item, of the user-specific association, to be rendered at an output component of the user device.

2. The method of claim 1, wherein performing image processing on the image data to identify the type of the object that is depicted in the image comprises:

identifying, based on performing the image processing on the image data, the type for the object and an additional type for an additional object depicted in the image.

3. The method of claim 2, further comprising, prior to causing the search to be conducted:

providing, for output at the user device, a first selectable indicator for the object and a second selectable indicator for the additional object, wherein the first selectable indicator identifies the object and the second selectable indicator identifies the additional object; and receiving, in response to providing the first selectable indicator and the second selectable indicator, an indication of a user selection of the first selectable indicator; and wherein causing the search to be conducted, based on the search query generated based on the type, is in response to receiving the indication of the user selection of the first selectable indicator that identifies the object for which the type is identified.

4. The method of claim 3, further comprising, prior to causing the search to be conducted:

generating an additional search query based on the additional type identified by performing the image processing.

5. The method of claim 4, wherein, in response to receiving the indication of the user selection of the first selectable indicator, a search is not conducted based on the additional search query.

6. The method of claim 1, wherein causing the given data item, of the user-specific association, to be rendered at the output component of the user device comprises causing the given data item to be audibly output at the output component.

7. The method of claim 1, wherein the user-specific data storage is local at the user device and wherein the search is conducted on the user device.

8. A system comprising:

one or more processors and one or more storage devices storing instructions that are operable, when executed by the one or more processors, to cause the one or more processors to perform operations comprising:

receiving a user input from a user of a user device, the input including a voice input;

storing, based on processing the input, including the voice input, and based on a current state of the user device, a user-specific association of a given data item with a given type of physical object, wherein storing the user-specific association is in a user-specific data storage that is associated with a user account of the user, wherein the given data item and the user-specific association are specified in the voice input; and subsequent to receiving the input and storing the user-specific association of the given data item with the given type of physical object:

receiving image data of an image that is captured by a camera of the user device, and that is captured by the camera subsequent to receiving the input and storing the user-specific association of the given data item with the given type of physical object;

performing image processing on the image data to identify a type for an object that is depicted in the image;

generating a search query based on the type identified by performing the image processing;

causing a search to be conducted, based on the search query, to determine that the user-specific association, of the given data item with the given type of physical object, stored in the user-specific data storage is responsive to the search query; and in response to determining that the user-specific association is responsive to the search query:

causing the given data item, of the user-specific association, to be rendered at an output component of the user device.

9. The system of claim 8, wherein performing image processing on the image data to identify the type of the object that is depicted in the image comprises:

identifying, based on performing the image processing on the image data, the type for the object and an additional type for an additional object depicted in the image.

10. The system of claim 9, further comprising, prior to causing the search to be conducted:

providing, for output at the user device, a first selectable indicator for the object and a second selectable indicator for the additional object, wherein the first selectable indicator identifies the object and the second selectable indicator identifies the additional object; and receiving, in response to providing the first selectable indicator and the second selectable indicator, an indication of a user selection of the first selectable indicator; and wherein causing the search to be conducted, based on the search query generated based on the type, is in response to receiving the indication of the user selection of the first selectable indicator that identifies the object for which the type is identified.

11. The system of claim 10, further comprising, prior to causing the search to be conducted:

generating an additional search query based on the additional type identified by performing the image processing.

12. The system of claim 11, wherein, in response to receiving the indication of the user selection of the first selectable indicator, a search is not conducted based on the additional search query.

13. The system of claim 8, wherein causing the given data item, of the user-specific association, to be rendered at the output component of the user device comprises causing the given data item to be audibly output at the output component.

14. The system of claim 8, wherein the user-specific data storage is local at the user device and wherein the search is conducted on the user device.

15. A non-transitory computer-readable medium storing software comprising instructions executable by one or more computers which, upon such execution, cause the one or more computers to perform operations comprising:
   receiving an input from a user of a user device, the input including a voice input;
   storing, based on processing the input, including the voice input, and based on a current state of the user device, a user-specific association of a given data item with a given type of physical object, wherein storing the user-specific association is in a user-specific data storage that is associated with a user account of the user,
      wherein the given data item and the user-specific association are specified in the voice input; and
   subsequent to receiving the input and storing the user-specific association of the given data item with the given type of physical object:
      receiving image data of an image that is captured by a camera of the user device, and that is captured by the camera subsequent to receiving the input and storing the user-specific association of the given data item with the given type of physical object;
      performing image processing on the image data to identify a type for an object that is depicted in the image;
      generating a search query based on the type identified by performing the image processing;
      causing a search to be conducted, based on the search query, to determine that the user-specific association, of the given data item with the given type of physical object, stored in the user-specific data storage is responsive to the search query; and
      in response to determining that the user-specific association is responsive to the search query:
         causing the given data item, of the user-specific association, to be rendered at an output component of the user device.

16. The non-transitory computer-readable medium of claim 15, wherein performing image processing on the image data to identify the type of the object that is depicted in the image comprises:
   identifying, based on performing the image processing on the image data, the type for the object and an additional type for an additional object depicted in the image.

17. The non-transitory computer-readable medium of claim 16, further comprising, prior to causing the search to be conducted:
   providing, for output at the user device, a first selectable indicator for the object and a second selectable indicator for the additional object, wherein the first selectable indicator identifies the object and the second selectable indicator identifies the additional object; and
   receiving, in response to providing the first selectable indicator and the second selectable indicator, an indication of a user selection of the first selectable indicator; and
   wherein causing the search to be conducted, based on the search query generated based on the type, is in response to receiving the indication of the user selection of the first selectable indicator that identifies the object for which the type is identified.

18. The non-transitory computer-readable medium of claim 17, further comprising, prior to causing the search to be conducted:
   generating an additional search query based on the additional type identified by performing the image processing.

19. The non-transitory computer-readable medium of claim 18, wherein, in response to receiving the indication of the user selection of the first selectable indicator, a search is not conducted based on the additional search query.

20. The non-transitory computer-readable medium of claim 15, wherein the user-specific data storage is local at the user device and wherein the search is conducted on the user device.

* * * * *